(12) United States Patent
Gorny et al.

(10) Patent No.: US 8,092,901 B2
(45) Date of Patent: *Jan. 10, 2012

(54) MULTI-LAYER WEATHER-RESISTANT, COLOURED PANEL

(75) Inventors: Rüdiger Gorny, Moon Township, PA (US); Siegfried Anders, Köln (DE); Wolfgang Nising, St. Augustin (DE); Wolfgang Ebert, Krefeld (DE); Robert Maleika, Düsseldorf (DE); Martin Döbler, Düsseldorf (DE); Melanie Möthrath, Düsseldorf (DE)

(73) Assignee: Bayer MaterialScience AG, Leverkusen (DE)

( * ) Notice: Subject to any disclaimer, the term of this patent is extended or adjusted under 35 U.S.C. 154(b) by 1090 days.

This patent is subject to a terminal disclaimer.

(21) Appl. No.: 10/498,158

(22) PCT Filed: Dec. 5, 2002

(86) PCT No.: PCT/EP02/13814
§ 371 (c)(1),
(2), (4) Date: Nov. 16, 2004

(87) PCT Pub. No.: WO03/049940
PCT Pub. Date: Jun. 19, 2003

(65) Prior Publication Data
US 2005/0084663 A1    Apr. 21, 2005

(30) Foreign Application Priority Data
Dec. 10, 2001  (DE) .................................. 101 60 569
Nov. 5, 2002  (DE) .................................. 102 51 323

(51) Int. Cl.
*B32B 7/02*   (2006.01)

(52) U.S. Cl. ....... 428/212; 428/213; 428/35.7; 428/323; 428/480

(58) Field of Classification Search ............. 428/212, 428/35.7, 213, 480, 323
See application file for complete search history.

(56) References Cited

U.S. PATENT DOCUMENTS

| | | | | |
|---|---|---|---|---|
| 4,927,675 A | | 5/1990 | Adams et al. ............... 428/35.9 |
| 4,948,666 A | * | 8/1990 | Paul et al. ..................... 428/334 |
| 5,055,346 A | | 10/1991 | Rohrbacher .................. 428/216 |
| 5,098,790 A | | 3/1992 | Diemunsch et al. .......... 428/412 |
| 5,232,964 A | * | 8/1993 | Evans et al. ..................... 524/94 |
| 6,149,995 A | * | 11/2000 | Peiffer et al. ................ 428/35.8 |
| 6,692,824 B2 | | 2/2004 | Benz et al. .................... 428/328 |
| 2003/0039821 A1 | | 2/2003 | Dobler et al. ................. 428/332 |
| 2003/0091814 A1 | | 5/2003 | Benz et al. .................... 428/328 |

FOREIGN PATENT DOCUMENTS

| | | |
|---|---|---|
| DE | 196 30 817 | 2/1998 |
| EP | 0 569 878 | 11/1993 |
| EP | 774 551 | 5/1997 |
| EP | 657 280 | 3/2001 |
| JP | 10-77360 | 3/1998 |
| WO | 02/38882 | 5/2002 |

\* cited by examiner

*Primary Examiner* — David Sample
*Assistant Examiner* — Lawrence Ferguson
(74) *Attorney, Agent, or Firm* — John E. Mrozinski, Jr.; Robert S. Klemz; Noland J. Cheung

(57) ABSTRACT

A multilayer product characterized by its improved weatherability and mechanical properties is disclosed. The product contains a layer A containing a member selected from the group consisting of transparent thermoplastic material and a lacquer, the member containing at least one UV absorber, a layer B containing a transparent thermoplastic material and containing at least one colorant, and a layer C containing a transparent thermoplastic material. Also disclosed is a process for the preparation of the inventive multilayer product.

8 Claims, No Drawings

MULTI-LAYER WEATHER-RESISTANT, COLOURED PANEL

The present invention relates to a multilayer product containing three layers A, B and C. In this connection layer A contains a base material selected from the group comprising a transparent thermoplastic material and a lacquer. In addition layer A contains a UV absorber. Layer B contains a transparent thermoplastic material and at least one colourant. Layer C contains a transparent thermoplastic material optionally with less colourant than B.

EP-A 0 359 622 discloses three-layer sheets. A first layer consists of polycarbonate, a second layer lying thereabove consists of polycarbonate that contains a volatile UV absorber, and a third layer lying thereabove consists of polycarbonate that contains a less volatile UV absorber. Sheets containing colourants are not disclosed in EP-A 0 359 622.

WO 02/38882 discloses two-layer sheets that contain an inorganic colour pigment in one of the two layers (the thinner, so-called co-extrusion layer). These sheets are more fireproof than sheets that contain an inorganic colour pigment in the thicker base layer.

EP-A 0 548 822 discloses two-layer sheets of transparent thermoplastic materials that contain IR-reflecting inorganic pigments in the outer layer.

EP-A 0 657 280 describes a process for the production of at least two-layer polycarbonate sheets. The coating layer contains 10 to 30 wt. % of particles with a metallic lustre of size 200 to 500 µm and optionally also UV absorber. In addition a layer may be co-extruded that contains polycarbonate and UV absorber.

EP-A 0 774 551 describes co-extruded polycarbonate sheets that may be two-layer or three-layer. One layer must be impermeable to IR radiation. At least one layer may contain UV absorber.

JP-A 10 077 360 discloses compositions that contain UV absorber and IR absorber, and in which the UV absorber is contained in a weight proportion of more than ten times that of the IR absorber. As preferred embodiment there is described an at least two-layer system in which the outer layer contains UV absorber and the underlying layer contains IR absorber and optionally UV absorber.

DE-A 10 117 785 discloses a transparent multilayer system of three layers (1, 2 and 3) that has the following structure. Layer 1 contains at least one organic IR absorber and at least one UV absorber, and layer 2 contains at least one UV absorber. Layer 3 may optionally be present. This layer contains neither IR absorber nor UV absorber.

Coloured products, for example sheets, that are known from the prior art have the following disadvantages.

Two-layer systems disclosed in WO 02/38882 are not sufficiently weather-resistant, and systems that contain the colourants in the base layer may exhibit a reduced weathering stability if the layer A is absent, and may have a reduced impact strength compared to the systems according to the invention.

These systems also have disadvantages as regards their production. After they have been produced by extrusion the extruder must be cleaned, which consumes a large amount of raw material.

The object of the present invention is to provide a product that on examination by the human eye conveys the same visual impression as the coloured products known from the prior art (i.e. it is or appears to be 'coloured'), and that does not have the aforedescribed disadvantages of the products known from the prior art.

This object is achieved by a multilayer product containing
a) a layer A containing a base material selected from the group comprising a transparent thermoplastic material and a lacquer and containing at least one UV absorber,
b) a layer B containing a transparent thermoplastic material and containing at least one colourant, and
c) a layer C containing a transparent thermoplastic material, optionally with colourants.

A multilayer product is preferred in which the layer B is 1 to 500 µm thick, preferably 5 to 300 µm thick, the layer A is 0.01 to 10 times as thick, preferably 0.1 to 3 times as thick, as the layer B, and the layer C is 20 to 10,000 times as thick, preferably 30 to 8,000 times, and particularly preferably 50 to 5,000 times as thick as the layer B.

Preferably the multilayer product is selected from the group comprising a sheet, a film, a tube and a profiled section.

This multilayer product is the subject of the present invention.

The present invention also provides a process for the production of this multilayer product involving a co-extrusion of the layers A, B and C.

The present invention furthermore provides a process for the production of this multilayer product, involving the application of the layer A by lacquering to a substrate that comprises the layers B and C.

The multilayer product according to the invention has numerous advantages. It has a high weathering resistance and is also transparent or translucent.

An advantage of the multilayer product according to the invention is that on examination by the human eye it conveys the same colour impression as a product all of whose layers are completely coloured and/or the same impression as a product whose base layer C is coloured.

The multilayer products according to the invention have the advantage that they are resistant to weathering. This advantage is imparted in particular by the layer A. The products have a high impact strength. This is achieved by the fact that the colourants, which reduce the impact strength, are contained only in the thin layer B.

The multilayer products according to the invention have the advantage that they can be produced in a convenient manner. So that the coloured layer B can be co-extruded, only the co-extruder need be filled and cleaned if the colour is changed, and not the main extruder, as is the case with systems that are coloured throughout. This is noticeable particularly in the case of thick sheets (the volume of the co-extruder is significantly smaller than that of the main extruder).

The multilayer products according to the invention look like fully coloured systems or systems in which the colourants are present in the layer B. Besides the aforementioned advantages they may also have the advantage of an improved fire resistance in the fire shaft test according to DIN 4102.

Transparent thermoplastic materials are for example polycarbonates, copolyester carbonates, polyesters, copolyesters, transparent blends of polycarbonates and polyesters and/or copolyesters, polyvinyl chloride, polymethyl methacrylate, polyethyl methacrylate, polystyrene, polysulfone, styrene/acrylonitrile copolymers, polyether sulfones, polyethylene, polypropylene or transparent mixtures of the aforementioned plastics.

Preferred plastics are polycarbonates, copolyester carbonates, polyesters, copolyesters, transparent blends of polycarbonates and polyesters and/or copolyesters.

Most particularly preferred is polycarbonate, and in this connection especially bisphenol A homopolycarbonate.

The layers A, B and C may contain different plastic materials or the same plastic material. Preferably A, B and C contain the same plastic material.

The lacquer that may be contained in layer A is the dried or hardened coating that is obtainable from a coating agent. In the present case it accordingly does not mean the coating agent that may additionally be applied to a substrate and thereafter hardened.

Lacquers that may be contained in layer A include for example acrylate lacquers, silicone lacquers and polyurethane lacquers.

In a particular embodiment of the invention layer A contains colourant.

In a particular embodiment of the invention layer A contains UV absorber (preferably 2 to 10 wt. %).

In a particular embodiment of the invention layer B contains UV absorber (preferably less than 1 wt. %).

In a particular embodiment of the invention layer C contains UV absorber (preferably less than 1 wt. %).

In particular embodiments of the present invention the multilayer product is a multilayer sheet. This may be fabricated as a solid sheet, which may be flat or corrugated, or as a multi-wall sheet (also termed cellular sheet), which may also be flat or corrugated.

The layers A, B and C may be produced jointly by co-extrusion if layer A contains a thermoplastic material.

If layer A contains a lacquer, then layer A may be applied by lacquering to a substrate that contains the layers B and C.

The light transmission (according to ASTM D 1003) of the multilayer product is preferably between 5% and 60%, particularly preferably between 10% and 55%. and most particularly preferably between 25% and 40%.

The multilayer pro duct according to the invention may, apart from the layers A, B and C, also contain further layers.

In a particular embodiment of the present invention the multilayer product consists of the layers A, B and C. No further layers are present.

The order of the layers A, B and C is arbitrary. A is preferably an outer layer. In a special embodiment the order is A, followed by B and then C. In a further particular embodiment the order is A, C, B.

The multilayer product according to the invention may for example have the following layer sequence:

A-B-C-A, A-B-C-B-A, A-B-C-B or A-B-C-D, A-C-B or A-C-B-A. In this connection D is not the same as A, B and C.

In a particular embodiment of the present invention the layer A is a layer on the outside of the product. This means that no further layer is applied on one side of layer A.

In an embodiment of the present invention colourants are dyes soluble in the thermoplastic material that absorb light between 400 nm and 750 nm and therefore generate a colour impression that can be detected by the human eye. UV absorbers and IR absorbers are in this case not understood to be colourants. UV absorbers and IR absorbers have as a rule an absorption maximum between 300 nm and 399 nm or between 751 nm and 1300 µm. Between 400 nm and 750 nm UV absorbers and IR absorbers can absorb light only to a small extent.

In an embodiment of the present invention colourants are pigments that are not soluble in the thermoplastic material but are present as particles. Pigments may be inorganic as well as organic. They are preferably either organic compounds or inorganic salts (possibly metal particles, possibly multilayer pigments). The pigments according to the invention absorb and/or scatter light between 400 nm and 750 nm (possibly more strongly than outside this range). The size of the pigments is preferably 1 nm to 1 mm, particularly preferably 5 nm to 400 µm, and most particularly preferably 200 nm to 1500 µm.

Layer A may contain different or the same colourants as layer B. The total concentration of the organic dyes in layer A and also the total concentration of the inorganic pigments in layer A is preferably less than the total concentration in layer B. Particularly preferably both are around 60% less and most particularly preferably around 80% less.

Layer C may contain different or the same colourants as layer B. The total concentration of the organic dyes in layer C as well as the total concentration of the inorganic pigments in layer C is preferably less than in layer B. Particularly preferably both are around 70% less and most particularly preferably both are around 90% less.

According to the invention any suitable UV absorbers may be employed. The following are preferred:

a) benzotriazole derivatives:

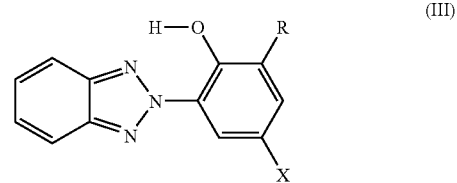

(III)

wherein
R and X are identical or different and denote H or alkyl or alkylaryl;

b) dimeric benzotriazole derivatives:

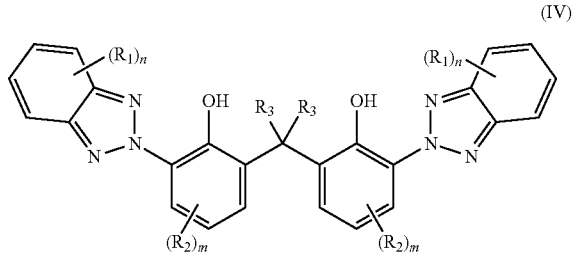

(IV)

wherein
R1 and R2 are identical or different and denote H, halogen, C1-C10-alkyl, C5-C10-cycloalkyl, C7-C13-aralkyl, C6-C14-aryl, —OR5 or —(CO)—O—R5, where
R5 denotes H or C1-C4-alkyl, R3 and R4 are also identical or different and denote H, C1-C4-alkyl, C5-C6-cycloalkyl, benzyl or C6-C14-aryl,
m is 1, 2 or 3,and
n is 1, 2, 3 or 4

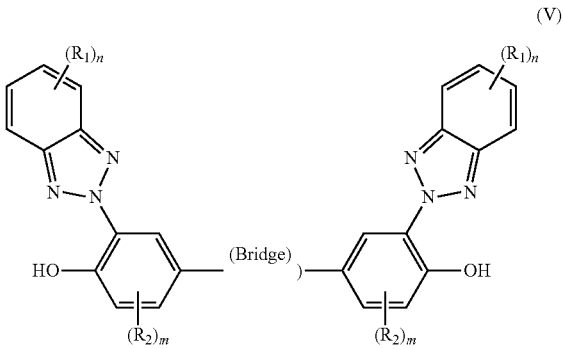

(V)

wherein the bridge denotes

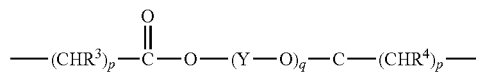

where R1, R2, m and n have the same meanings as for formula (IV),
wherein also p is a whole number from 0 to 3, q is a whole number from 1 to 10,
Y denotes —CH2-CH2—, —(CH2)3-, —(CH2)4-, —(CH2)5-, —(CH2)6- or CH(CH3)-CH2- and R3 and R4 have the same meanings as for formula (II);

c) triazine derivatives

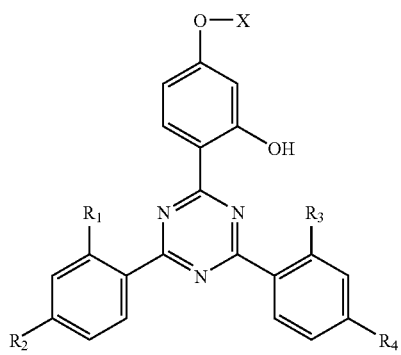

wherein
R1, R2, R3 and R4 in formula (VI) are identical or different and denote H or alkyl or CN or halogen, and
X denotes alkyl;

d) triazine derivatives
as in EP 1033243;

e) dimeric triazine derivatives

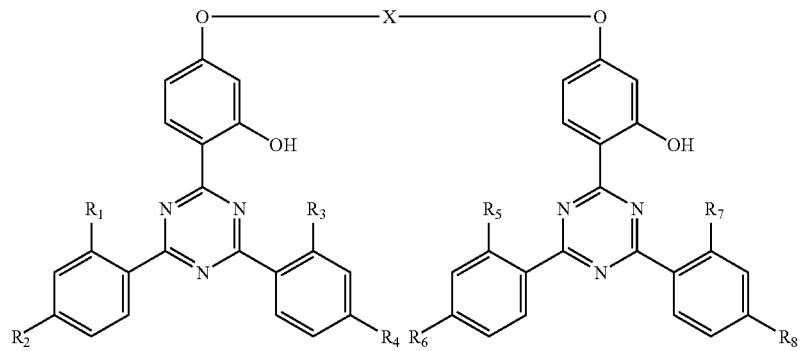

wherein
R1, R2, R3, R4, R5, R6, R7 and R8 in formula (VII) are identical or different and denote H or alkyl or CN or halogen, and X denotes alkyl or —(CH2CH2-O-)n-C(=O)—;

f) diarlycyanoacrylates (VIII)

wherein

R1 to R40 are identical or different and denote H, alkyl, CN or halogen;

g) diarylcyanoacrylates of the formula (IX)

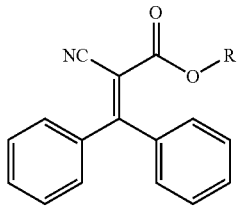

wherein

R denotes C2-alkyl to C10-alkyl or aryl.

Preferred in this connection are Uvinul 3035 where R=C2H5 and Uvinul 3039 where R=CH2CH(C2H5)C4H9.

h) Hydroxybenzophenone derivatives

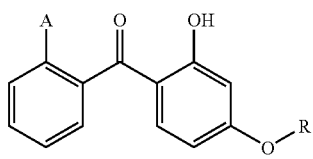

(X)

wherein

A denotes H or OH and

R denotes H, alkyl, acyl, (CH2)n-O—(CH2)n-CH3, (CH2)n-O—C(=O)—(CH2)n-CH3, where n=1-20 i) Resorcinol derivatives

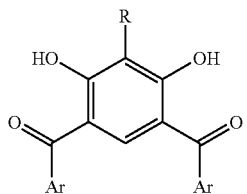

(XI)

wherein

Ar denotes phenyl, naphthyl, alkylphenyl, alkoxyphenyl and

R denotes H, alkyl, isoalkyl, cycloalkyl, acyl, (CH2)n-O—(CH2)n-CH3, —(CH2)n-O—C(=O)—(CH2)n-CH3, —C(=O)—(CH2)n-CH3, —C(=O)—Ar, where n=1-20

One or more UV absorbers may be contained in all layers.

In layer A there are preferably used the following UV absorbers of the formulae III (e.g. Tinuvin 234), IV (e.g. Tinuvin 360), VI (e.g. Tinuvin 1577), VIII (e.g. Uvinul 3030), X (e.g. Chinaassorb 81).

In layers B and C there are preferably used the following UV absorbers of the formulae (III) (e.g. Tinuvin 329, Tinuvin 350, Tinuvin 234), IV (e.g. Tinuvin 360), VI (e.g. Tinuvin 1577), VIII (e.g. Uvinul 3030) and IX, (e.g. Uvinul 3035, Uvinul 3039) and X (e.g. Chinaassorb 81).

The multilayer product according to the invention may be used for example as a sheet for partitions, roofing materials or the like. Pipes of the material may be used for example to transport liquids or gases. Profiled sections may be used as building and construction materials.

The invention claimed is:

1. A multilayer product consisting of:
   a) an outer layer A containing a base material comprising a transparent thermoplastic material selected from the group consisting of polycarbonate and copolyester carbonates, and a lacquer and containing at least one UV absorber;
   b) a layer B containing a transparent thermoplastic material selected from the group consisting of polycarbonate and copolyester carbonates, and containing at least one colourant; and
   c) a layer C containing a transparent thermoplastic material selected from the group consisting of polycarbonate and copolyester carbonates,
   wherein the layer B is 1 to 500 μm thick, the layer A is 0.01 to 10 times as thick as the layer B, and the layer C is 20 to 10,000 times as thick as the layer B.

2. The multilayer product according to claim 1 selected from the group consisting of a sheet, a film, a pipe and a profiled section.

3. A process for the production of the multilayer product according to claim 1 comprising co-extruding the layers A, B and C.

4. A process for the production of the multilayer product according to claim 1 comprising applying layer A by lacquering to a substrate that consists of the layers B and C.

5. A multilayer product consisting of:
   a) a an outer layer A containing a member comprising a transparent thermoplastic material selected from the group consisting of polycarbonate and copolyester carbonates, and a lacquer and containing at least one UV absorber;
   b) a layer B containing a transparent thermoplastic material selected from the group consisting of polycarbonate and copolyester carbonates, and containing at least one colourant; and
   c) a layer C containing a transparent thermoplastic material selected from the group consisting of polycarbonate and copolyester carbonates,
   wherein the layer B is 1 to 500 μm thick, the layer A is 0.01 to 10 times as thick as the layer B, and the layer C is 20 to 10,000 times as thick as the layer B.

6. The multilayer product according to claim 5 selected from the group consisting of sheet, film, pipe and profiled section.

7. A process for the production of the multilayer product of claim 5 comprising co-extruding layers A, B and C.

8. A process for the production of the multilayer product of claim 5 comprising applying layer A by lacquering to a substrate that consists of the layers B and C.

* * * * *